T. CHRISTOPHERSON.
AUTOMOBILE TIRE.
APPLICATION FILED FEB. 7, 1911.

1,010,234.

Patented Nov. 28, 1911.

WITNESSES:
E. Larson
H. M. Brooks

INVENTOR
T. Christopherson
BY
Attorneys

UNITED STATES PATENT OFFICE.

THOMAS CHRISTOPHERSON, OF EAST HELENA, MONTANA.

AUTOMOBILE-TIRE.

1,010,234.
Specification of Letters Patent. Patented Nov. 28, 1911.
Application filed February 7, 1911. Serial No. 607,213.

*To all whom it may concern:*

Be it known that I, THOMAS CHRISTOPHERSON, a citizen of the United States, residing at East Helena, county of Lewis and Clark, State of Montana, have invented a new Tire for Automobiles and other Carriages, of which the following is a specification.

This invention primarily resides in automobile or other vehicle tires comprising a plurality of resilient members slidably and detachably mounted on the felly of the wheel. By the construction hereinafter disclosed, the cost of the maintenance of vehicle tires is greatly minimized and at the same time a durable and resilient structure is obtained.

An advantage derived from the detachability of each of the several resilient members makes possible the replacing of any disabled member by new ones and thus saves nearly the cost of a new tire.

With the above and other objects in view, this invention consists in the construction, combination, and arrangement of parts, all as hereinafter more fully described, claimed, and illustrated in the accompanying drawings, wherein—

Figure 1:
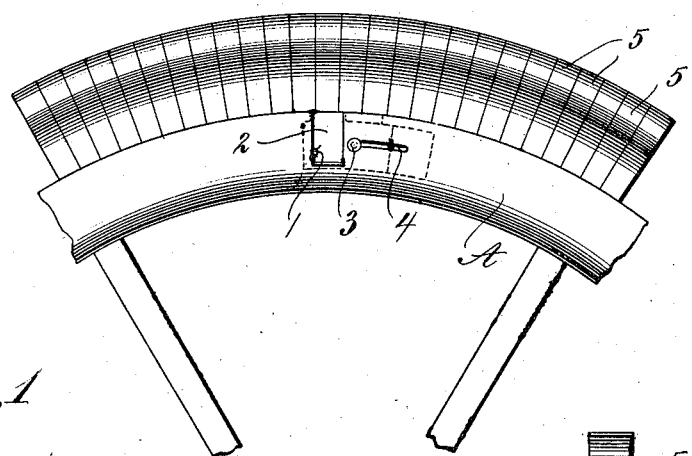
Figure 4:
Figure 2:
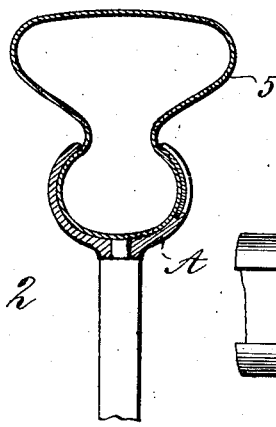
Figure 5:
Figure 3:
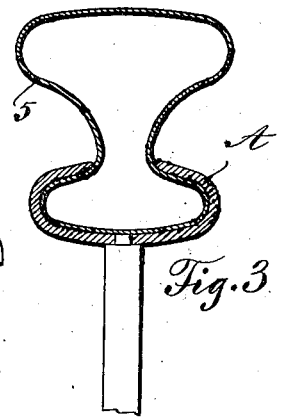

Figure 1 is a fragmentary side elevation of a vehicle wheel having the present invention applied thereto; Fig. 2 is a sectional view disclosing the mounting of the present invention on the felly of the wheel; Fig. 3 is a view similar to Fig. 2, illustrating the present invention as applied to a different shaped felly; Fig. 4 is a side elevation of one of the resilient members employed in the construction of the spring tire; and Fig. 5 is a fragmentary top plan view of the felly, a part thereof being in section to clearly illustrate the detailed construction.

Throughout the following detail description and on the several figures of the drawings, similar parts are referred to by like reference characters.

With special reference to the drawings, A indicates the felly of the wheel which may be of any desired shape in cross section, but as shown in Fig. 2, the felly comprises upwardly and inwardly extending spaced flanges. One side of the felly is provided with an opening 1 in which the resilient members are inserted, as will be hereinafter more fully described. This opening is closed by a slide 2 which is operated by a screw or other desirable member 3 projecting through a slot 4 provided in the felly for that purpose.

The spring tire comprises a plurality of resilient members 5 which are preferably made of steel spring and are of the desired shape. Each resilient member tapers toward the hub whereby a neat and solid appearance is given the tire when the plurality of members are assembled.

When it is desired to apply the spring tire constituting the present invention to a vehicle wheel having a felly similar in construction to that above referred to, the slide or closure member 2 is operated to uncover the opening 1, through which latter the spring members are inserted, one at a time, and are then forced around the felly until the latter is filled. Then the closure or slide 2 is moved to cover the opening 1, as will be obvious. The spring members are prevented from displacement by the outer edges of the felly being inclined inwardly in producing a clamping action upon said members. These inwardly inclined edges of the felly form a reinforcement for the spring members and prevent the latter from bending out of shape below the central bends of the sides thereof.

By having the resilient members slidably mounted on the felly, the replacing of any disabled member by a new one is greatly facilitated as the former may be forced around the felly until it comes to the opening 1 where it may be removed. In this way a single opening in the felly is all that is needed for the placing and removing of each or all of the resilient members.

Having thus fully described my invention, what is claimed as new is:—

In a wheel, a felly having upwardly and inwardly extending spaced flanges, one flange thereof being provided with an opening therein, a plurality of hollow metallic spring members mounted on said felly, said metallic spring members having their edges tapering toward the center of the wheel and normally bearing on one another for their entire length, the sides of said members being flared outwardly beyond the felly of the wheel to form a flat tread surface, and means for closing the opening in said flange.

THOMAS CHRISTOPHERSON.

Witnesses:
M. A. JACOBS,
MATT O. ROBERTSON.